United States Patent
Yasinski et al.

(10) Patent No.: US 10,308,436 B2
(45) Date of Patent: Jun. 4, 2019

(54) MODULAR CONVEYOR BELT WITH ATTACHED PLATES

(71) Applicant: Laitram, L.L.C., Harahan, LA (US)

(72) Inventors: Elena Rose Yasinski, Santa Clara, CA (US); Timothy J. DeRoche, Boutte, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/777,055

(22) PCT Filed: Nov. 29, 2016

(86) PCT No.: PCT/US2016/063949
§ 371 (c)(1),
(2) Date: May 17, 2018

(87) PCT Pub. No.: WO2017/105819
PCT Pub. Date: Jun. 22, 2017

(65) Prior Publication Data
US 2018/0327187 A1     Nov. 15, 2018

Related U.S. Application Data

(60) Provisional application No. 62/268,286, filed on Dec. 16, 2015.

(51) Int. Cl.
| | |
|---|---|
| *A22C 17/00* | (2006.01) |
| *B65G 17/06* | (2006.01) |
| *B65G 17/14* | (2006.01) |
| *B65G 17/34* | (2006.01) |
| *B65G 17/42* | (2006.01) |

(52) U.S. Cl.
CPC .......... *B65G 17/34* (2013.01); *A22C 17/0093* (2013.01); *B65G 17/065* (2013.01); *B65G 17/14* (2013.01); *B65G 17/42* (2013.01); *B65G 2207/30* (2013.01)

(58) Field of Classification Search
CPC ........ B65G 17/34; B65G 17/14; B65G 17/42; B65G 2207/30; B65G 17/065; B65G 17/08; B65G 17/086; B65G 17/40; B65G 17/44
USPC .................................................. 198/850–853
See application file for complete search history.

(56) References Cited

U.S. PATENT DOCUMENTS

| | | | | |
|---|---|---|---|---|
| 4,629,063 A | * | 12/1986 | Hodlewsky | B65G 37/005 198/626.6 |
| 4,832,183 A | * | 5/1989 | Lapeyre | B65G 17/08 198/690.2 |
| 5,316,130 A | * | 5/1994 | Heit | B65G 17/44 198/781.06 |
| 5,497,874 A | * | 3/1996 | Layne | B65G 17/08 198/377.01 |
| 6,186,314 B1 | | 2/2001 | Conklin, Jr. | |
| 9,701,478 B1 | * | 7/2017 | Leslie | B65G 17/34 |

(Continued)

FOREIGN PATENT DOCUMENTS

JP     2013107731 A     6/2013

*Primary Examiner* — Mark A Deuble
(74) *Attorney, Agent, or Firm* — James T. Cronvich

(57) ABSTRACT

A modular conveyor belt constructed of a series of conveyor belt modules, some of which include retainers for removably retaining plates, such as cutting boards, to the outer surface of the belt. The longitudinal extent of each of the retained plates in the direction of belt travel exceeds the articulation pitch of the conveyor belt.

19 Claims, 7 Drawing Sheets

(56) References Cited

U.S. PATENT DOCUMENTS

| | | |
|---|---|---|
| 2007/0007110 A1 | 1/2007 | Kaufman et al. |
| 2010/0012456 A1 | 1/2010 | Magaldi |
| 2015/0183585 A1* | 7/2015 | Menke .................. B65G 17/08 198/853 |
| 2015/0274338 A1 | 10/2015 | Kawano et al. |
| 2015/0292935 A1 | 10/2015 | Kleczewski |
| 2016/0221758 A1* | 8/2016 | Bogle .................... B65G 17/40 |

* cited by examiner

MODULAR CONVEYOR BELT WITH ATTACHED PLATES

BACKGROUND

The invention relates generally to power-driven conveyors and more particularly to modular articulated conveyor belts with attachments.

Conveyor belts are used to convey meat, poultry, or seafood carcasses on butchering lines. In some cases the carcasses are removed from the belt and butchered on separate cutting surfaces. Then the butchered pieces are placed back on the belt for further processing downstream. But transferring the carcasses between the belt and the cutting surface can result in dropped or damaged product and is heavy work for the butchers. Furthermore, the cutting surfaces take up plant space. In other cases the conveyor belt is made sturdy with a rigid flat top surface on which some butchering can be performed. But the force of chopping tends to reduce the useful life of the belt, and the scoring of the top surface by knife blades causes sanitation problems.

SUMMARY

One version of a modular conveyor belt embodying features of the invention comprises a series of rows of belt modules joined end to end at hinge joints between consecutive rows, in which the distance in a direction of belt travel between consecutive hinge joints defines the belt pitch. The modules form an outer belt surface. Some of the rows of belt modules include a retainer. Each of a plurality of plates is retained by the retainer on a separate one of the rows. The plates have a length in the direction of belt travel that is greater than the belt pitch.

In another aspect, a conveyor belt module embodying features of the invention comprises first hinge elements spaced apart along a first end of the module and second hinge elements spaced apart along an opposite second end. Between the first and second ends is an intermediate section having an outer surface. A retainer includes at least one clip at the outer surface.

DETAILED DESCRIPTION

Figure 1A:
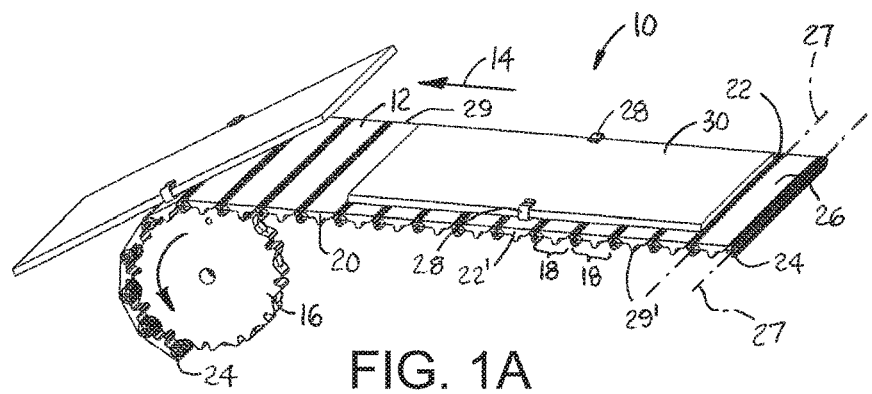
FIGS. 1A and 1B are axonometric and side elevation views of a portion of a belt conveyor embodying features of the invention.
Figure 1B:
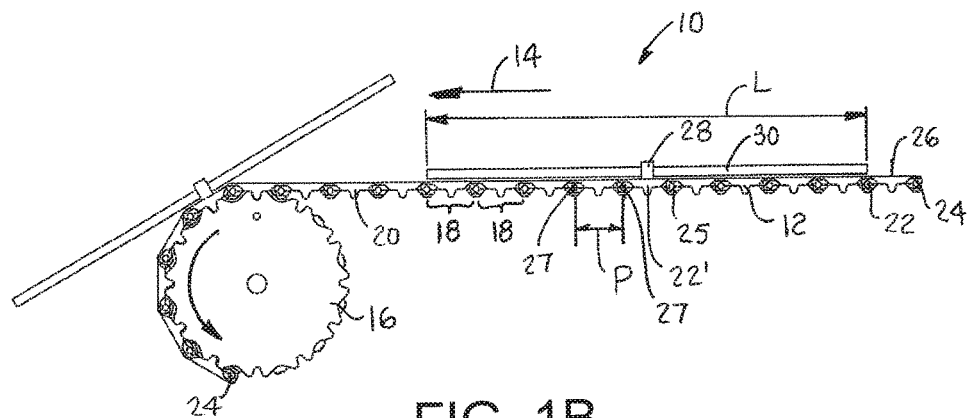

FIGS. 1A and 1B show an end portion of a conveyor embodying features of the invention. The conveyor 10 comprises a modular conveyor belt 12 driven in a direction of belt travel 14 by motor-driven sprockets 16. The conveyor belt 12 is constructed of a series of rows 18 of one or more belt modules 20 connected end to end at lateral hinge joints 22. In this example each row 18 is formed by a single belt module 20. But the rows 18 could be formed of multiple side-by-side belt modules arranged in a bricklay pattern with the other belt rows, for instance.

One example of a commercially available conveyor belt is the INTRALOX® Series 800 Tough Flat Top modular plastic conveyor belt manufactured and sold by Intralox, L.L.C., of Harahan, Louisiana, U.S.A. The belt modules 20 have hinge elements 24 along each end that are interleaved with the hinge elements of modules of a consecutive row 18. The consecutive rows are joined at the hinge joint 22 by a hinge rod 25 received in a lateral passageway formed by aligned rod holes in the interleaved hinge elements and forming a hinge axis 27. The belt 12 articulates at the hinge joints 22 as it makes its way around the sprockets 16. The distance between consecutive hinge axes 27 is defined as the belt pitch P.

All the belt modules 22 in the example of FIGS. 1A and 1B have a flat outer surface 26 in an intermediate portion of each module between the hinge elements 24 along opposite ends. Some of the belt modules 22' have retainers 28 at their outer surfaces 26. The retainers 28 hold a flat plate 30 to one of the belt rows 18. In this example the plate 30 is indented inward of both side edges 29, 29' of the belt 12. The flat plate 30, which can be a cutting board, for example, extends in length in and opposite the direction of belt travel 14 past the ends of the retainer belt modules 22' over a number of leading and trailing belt rows 18. In this example the length L of the plate 30 is about nine times the belt pitch (L=9P). Because the plate 30 is retained to only one belt row 18, it can make its way around the sprocket 16 as the belt articulates under it at the hinge joints 22. That allows the plate 30 to be made of a durable, rigid material that can serve as a cutting board on which carcasses can be butchered as the belt 12 advances.

Figure 2:
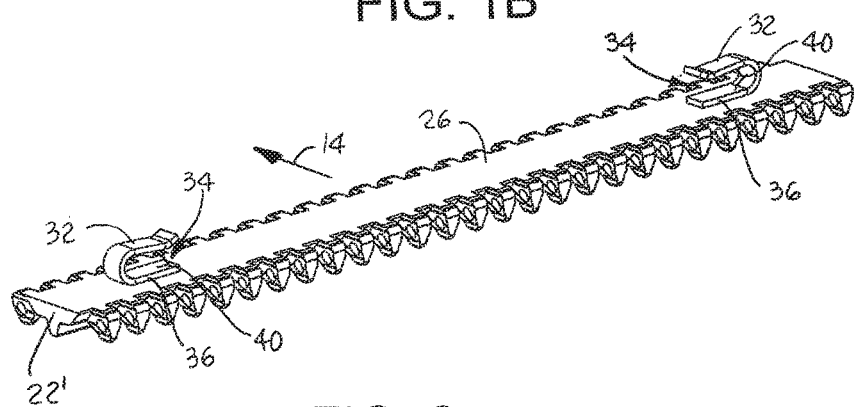
FIG. 2 is an isometric view of a belt module forming a row of the modular conveyor belt in the conveyor of FIGS. 1A and 1B.
Figure 3:
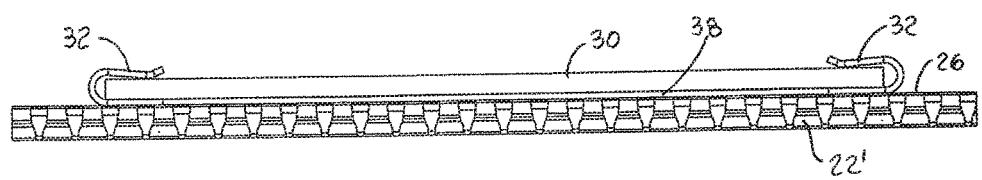
FIG. 3 is a front elevation view of the belt module of FIG. 2 retaining a cutting board.

More details of the retainer module 22' are shown in FIGS. 2 and 3. The retainer comprises a pair of C-shaped dips 32 whose open ends 34 face each other across the module 22'. The dips 32 have a lower base 36 attached to the outer surfaces 26 of the retainer module 22'. As shown in FIG. 3, the plate 30 is retained by the clips 32 at the plate's side edges. The edges sit atop the bases 36 of the clips slightly above the outer surface 26 of the module 22' across a small gap 38. The C-shaped clips 32 have open sides so that the plate 30 can be installed on or removed from the retainer by sliding in or opposite to the direction of belt travel 14 (into or out of the page in FIG. 3). To help prevent the plate 30 from sliding in the direction of belt travel 14 while the belt is running, the inner surface 40 of the clips can be coated with a high-friction material.

Figure 4:
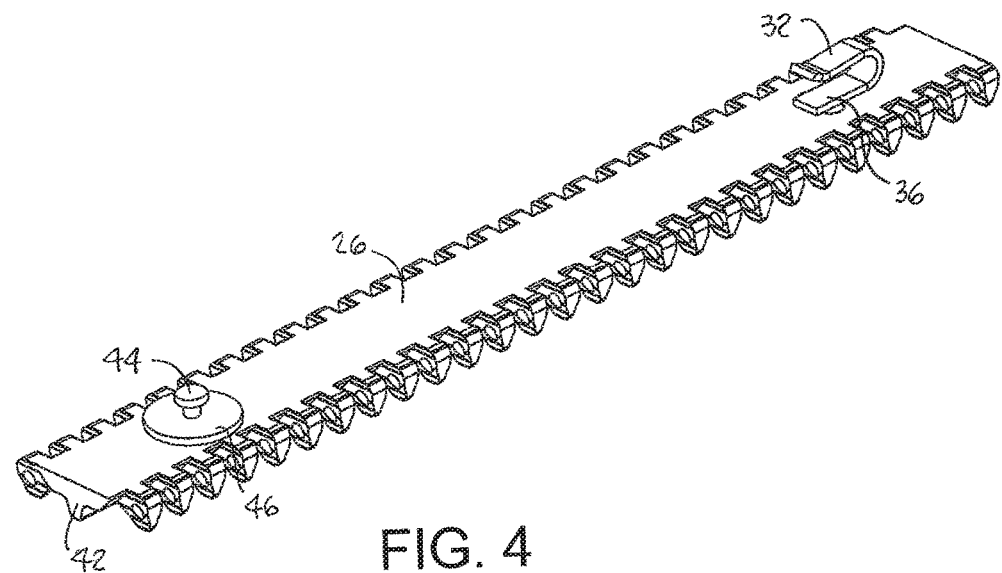
FIG. 4 is an isometric view of another version of a belt module with cutting-board retainers usable in a conveyor belt as in FIGS. 1A and 1B.
Figure 5:
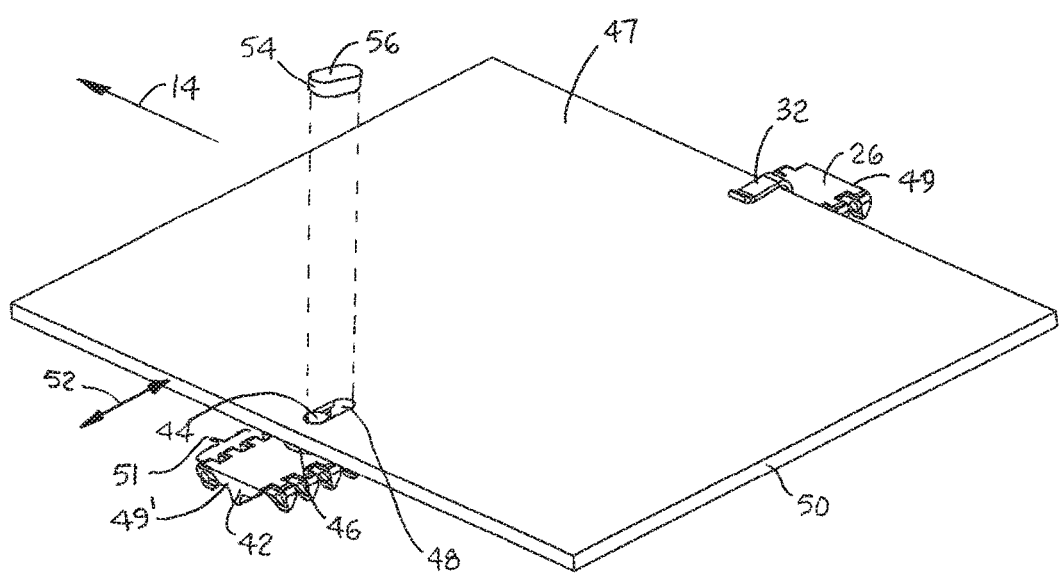
FIG. 5 is an isometric view of the belt module of FIG. 4 retaining a cutting board.

Another version of a retainer belt module is shown in FIGS. 4 and 5. The belt module 42 has a retainer that includes a C-shaped clip 32 as in FIG. 2 at one side and a stud 44 extending upward from the outer surface 26 of the module at the other side. Like the dip 32, the stud 44 has a wider base 46 that sits atop the module's outer surface 26. A plate 50, similar to the plate 30 of FIG. 3, but with a registration slot 48 through its thickness, is retained to the module 42 by the dip 32 at one side and by the stud 44 received in the slot 48. Like the plate 30 in FIG. 3, the plate 50 is indented inward of the side edges 49, 49' of the module 42 leaving indentions 51 on both sides. The plate 50 is installed on and removed from the module 42 in a direction 52 perpendicular to the direction of belt travel 14. The stud 44 received in the slot 48, which is elongated in the width direction 52 of the module 42, registers the plate 50 to the module. An optional cover 54 can be used to cover the slot 48. The top 56 of the cover 54, when installed, is flush with the outer surface 47 of the plate 50. The bases 36, 46 of the clip 32 and the stud 44 support the plate 50 slightly above the top surface 26 of the retainer module 42.

Figure 6:
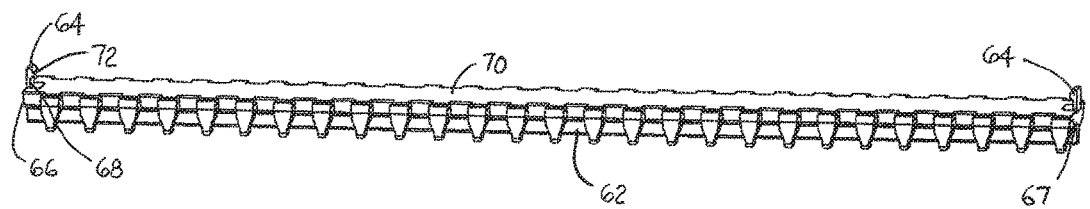
FIG. 6 is an axonometric view of another version of a belt module with cutting-board retainers at the side edges of a conveyor belt as in FIGS. 1A and 1B.
Figure 7:
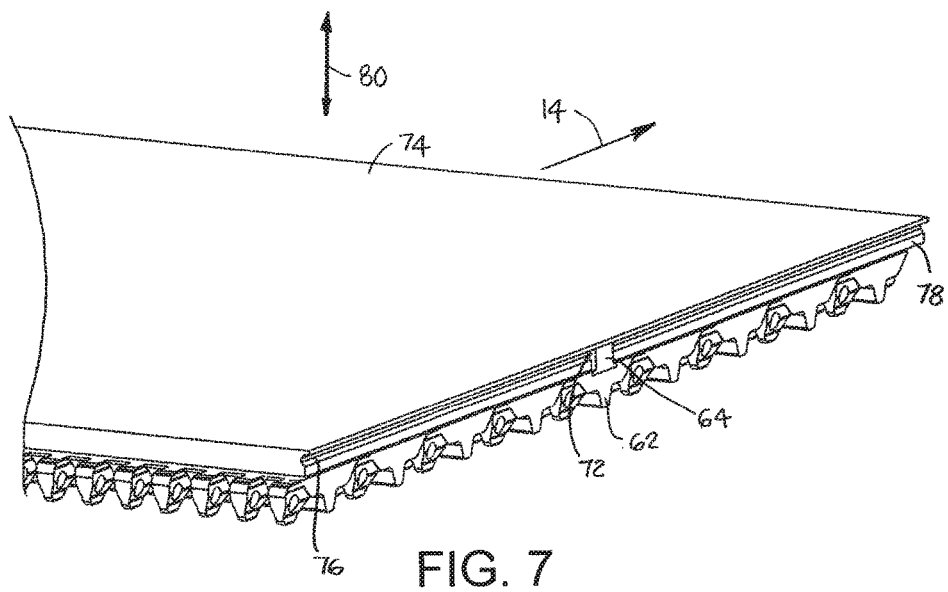
FIG. 7 is an axonometric view of a portion of a conveyor belt made with a belt module as in FIG. 6 retaining a cutting board.

FIG. 6 shows another version of a retainer belt module 62 with a retainer that comprises a pair of clips 64 at opposite side edges 66, 67 of the module. The module 62 can be a monolithic module that extends in width from side edge to side edge to form a belt row by itself. Or the module 62 in FIG. 6 can represent a belt row constructed of two or more side-by-side modules, in which the dips 64 are located on the outermost modules forming the side edges 66, 67 of the row. The dips 64 may be formed with the module 62 or may be attached to the module by fastening, bonding, welding, co-molding, or overmolding, for example. The clips 64 each have a shank 68 that extends upward from the module's outer belt surface 70 at a side edge. A lip 72 formed on an inward-facing side of the shank 68 extends inward over the outer belt surface 70 toward the opposite side edge of the module 62. Unlike the C-shaped clips 32 shown in FIG. 3, the dips 64 in FIGS. 6 and 7 do not have bases that sit atop the outer surface 70 of the module 62. So a plate, such as a cutting board 74 as in FIG. 7, can sit flat on the outer surface of the retainer module 62 without an intervening gap. Sitting flat on the outer surface provides the cutting board 74 with more backing to distribute the load and impact forces over a greater portion of the conveyor belt.

The cutting board 74 has a longitudinal groove 76 in each of its side edges 78. The lips 72 of the dips 64 are received in the grooves 76 and hold the cutting board 74 in place on the retainer module 62. The board 74 can be installed and removed by sliding it in or opposite to the direction of belt travel 14 with the lips 72 of the clips 64 riding along the grooves until the board is in the installed position or is free of the dips and can be removed. Or the cutting board 74 can be installed from above along a vertical path 80 by spreading the clips 64 until the lips snap into place in the grooves 76. The board 74 can then be removed by first spreading the dips 64 until they are dear of the groove so the board can be lifted from the retainer belt module 62.

Figure 8:
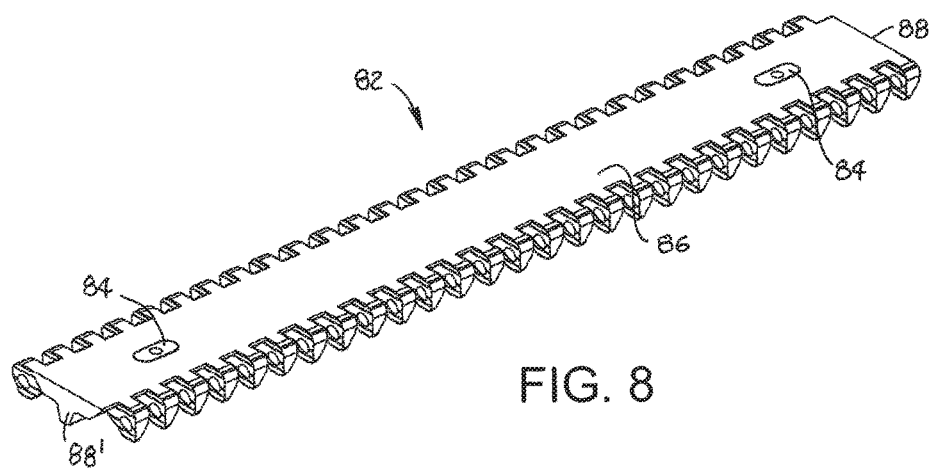
FIG. 8 is an isometric view of a conveyor belt module with insert nuts for cutting-board retaining screws for a belt conveyor embodying features of the invention.
Figure 9:
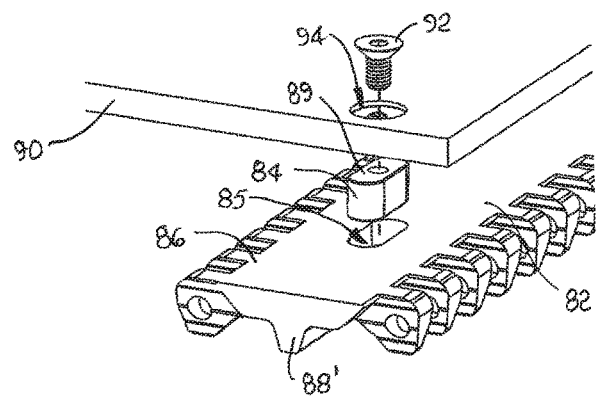
FIG. 9 is an exploded isometric view of the corner portion of a belt module as in claim 8 showing the affixation of a cutting board.
Figure 10:
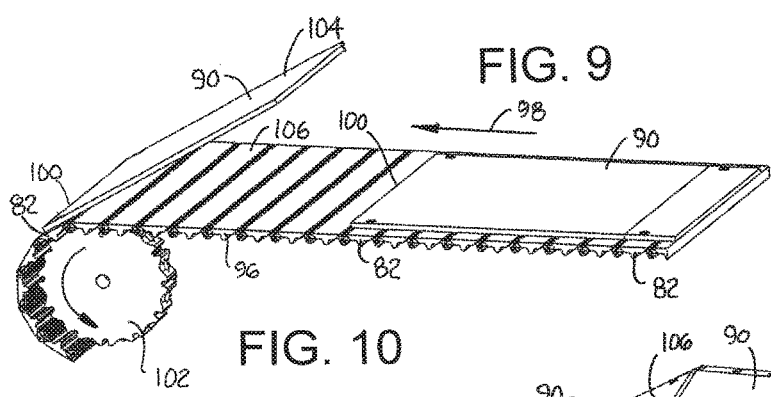
FIG. 10 is an isometric view of the drive-sprocket end of a belt conveyor made up of the modules of FIG. 8 with cutting boards attached at a leading edge of board.
Figure 11:
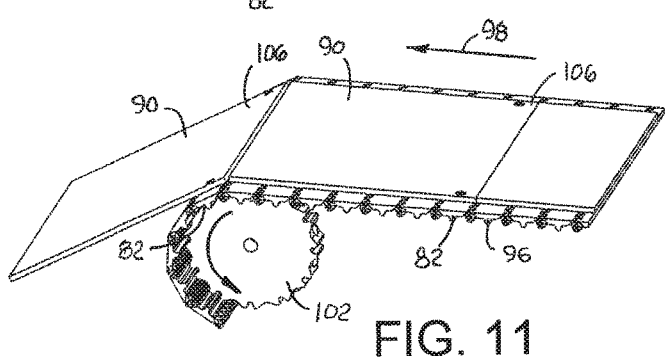
FIG. 11 is an isometric view of the drive-sprocket end of a belt conveyor as in FIG. 10, but with cutting boards attached at a trailing end.

Yet another version of a retainer belt module is shown in FIGS. 8 and 9. The module 82 has a pair of threaded insert nuts 84 embedded in cavities 85 opening into the module's outer surface 86 near the side edges 88, 88'. The top face 89 of each nut 84 can be flush with, recessed slightly below, or raised slightly above the top outer surface 86 of the module 82. A plate, such as a cutting board 90, is fastened to the module 82 at two corners with countersunk machine screws 92 threaded into the embedded insert nuts 84. Countersunk holes 94 in the cutting boards 90 receive the head ends of the machine screws 92. As shown in FIG. 10, the boards 90 are attached to a conveyor belt 96 advancing in a direction of belt travel 98 near leading edges 100 of the boards. The cutting boards 90 are shown indented inward of the side edges of the belt 96, but could be flush with or could extend outward of the side edges. As the boards 90 round a sprocket 102, the upstream end 104 separates from the top surface 106 of the belt 96. The cutting board 90 is cantilevered from the retainer module 82 as it rounds the sprocket 102. Alternatively, the cutting boards 90 can be fastened to a retainer module 82 at a trailing end 106 as shown in FIG. 11.

Figure 12:
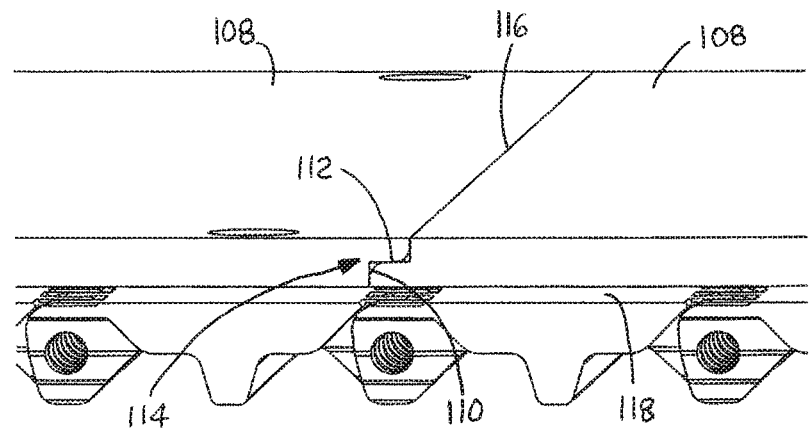
FIG. 12 is an axonometric view of a portion of a belt conveyor as in FIG. 10 with cutting boards having lap joints.

Unlike the cutting boards 90 of FIGS. 8-11, the cutting boards 108 of FIG. 12 have shoulders 110 and cheeks 112 at confronting edges that mate in a lap joint 114 on a straight belt run. The lap joint has a seam 116 with offset vertical portions. The offset seam 116 protects the belt's outer surface 118 from being cut by a knife blade or tip extending all the way through a straight-through vertical seam perpendicular to the outer belt surface as in the butt joint between the abutting cutting boards of FIG. 10.

Figure 13:
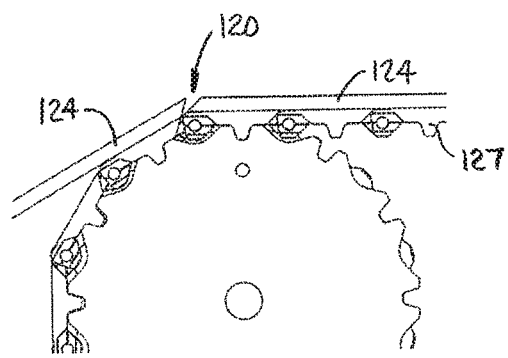
FIG. 13 is a side elevation view of a belt conveyor as in FIG. 10 having cutting boards with angled joints.
Figure 14:
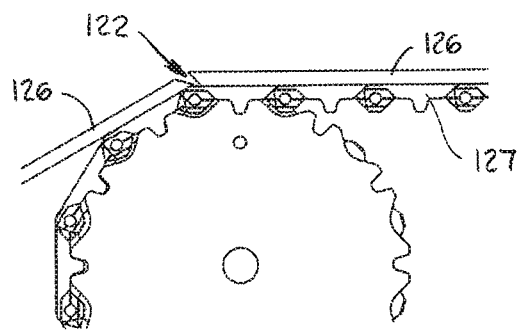
FIG. 14 is a side elevation view of a belt conveyor with angled joints angled in the opposite direction from those of FIG. 13.

FIGS. 13 and 14 show scarf joints 120, 122, in which the confronting edges of adjacent cutting boards 124, 126 are complementarily beveled on an angle. A belt having cutting boards 124, 126 with scarf joints 120, 122 can be driven in either direction without interference—unlike a belt with cutting boards meeting in lap joints, which have a preferred direction of belt travel to avoid interference between adjacent boards during initial separation when the retainer module enters a sprocket. Because the seams formed by the scarf joints are not perpendicular to the planes of the cutting boards 124, 126—as in butt joints—they reduce the risk of a knife tip or blade's reaching and damaging the outer surface of the belt modules 127.

Figure 15:
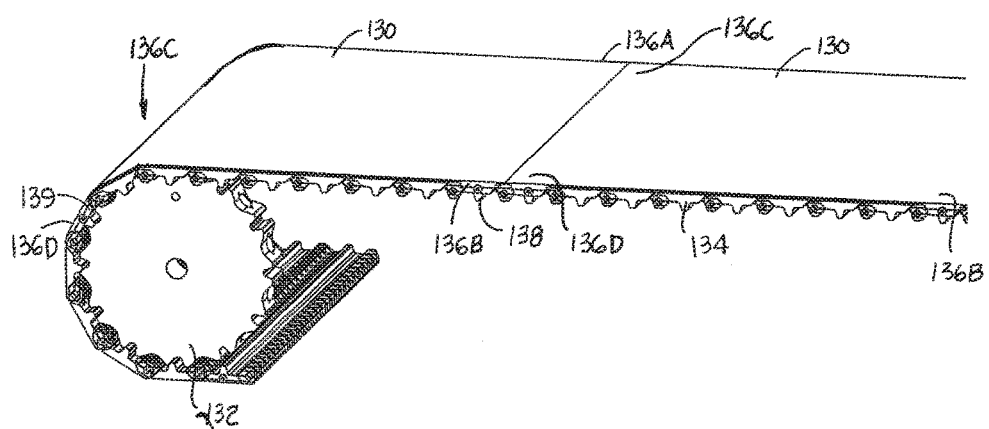
FIG. 15 is an axonometric view of a portion of a belt conveyor embodying features of the invention including flexible cutting boards.

Another version of a cutting board is shown in the conveyor system of FIG. 15. Instead of a rigid-plate cutting board, the cutting boards 130 are plates that are flexible enough to bend around sprockets 132. So the flexible cutting boards 130 can be fastened to the conveyor belt 134 at more than a single belt module or row. For example, the cutting boards 130 can be attached at their four corners 136A-D to two spaced apart retainer modules 138, 139.

Figure 16A:
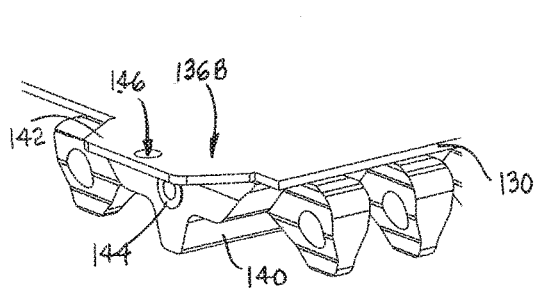
FIGS. 16A and 16B are isometric views of one corner of a belt module as in FIG. 15 showing the affixation of the flexible cutting board to the belt module by a machine screw.
Figure 16B:
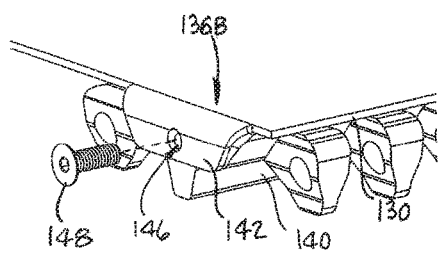
Figure 17:
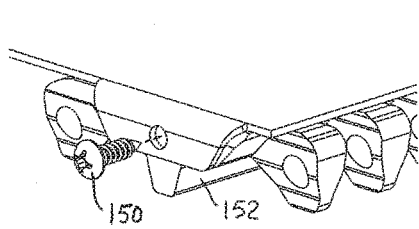
FIG. 17 is an isometric view of one corner of a belt module as in FIGS. 16A and 16B with the cutting board attached by a self-threading screw.

One way to fasten one corner 136B of the cutting board 130 to a retainer module 140 is shown in FIGS. 16A and 16B. The flexible cutting board 130 has a tab 142 extending laterally outward at each corner 136A–D. A threaded insert nut 144 is embedded in a cavity in the side edge of the module 140. The flexible tab 142 can be bent downward so that a hole 146 through the tab 142 aligns with the insert nut 144. A machine screw 148 extends through the hole 146 and is threaded into the nut 144 to affix the corner of 136B of the flexible board 130 in place. The other three corners are similarly affixed to the belt. An alternative method of affixation is shown in FIG. 17. In this version a thread-forming screw 150 is threaded directly into a hole (not shown) in the side edge of the module 152 without the need for a threaded insert nut.

Figure 18:
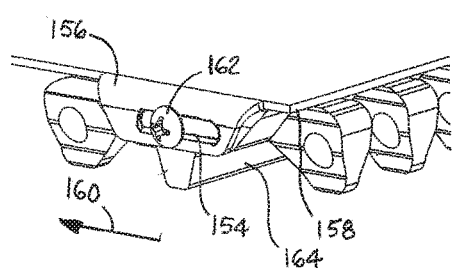
FIG. 18 is an isometric view of a corner of a belt module as in FIG. 17 with a slotted hole to accommodate stretching of the flexible cutting board around sprockets and return shoes or drums.

Because the flexible cutting boards of FIGS. 15–17 are affixed to the belt at both ends and because the arc length defined by the belt's outer surface rounding a sprocket is greater than its linear length on a horizontal carryway, the cutting boards are stretched as the belt articulates. To accommodate the lengthening of the belt at the sprocket, as well as the compression of the cutting board 158 when the belt backflexes around return shoes or rollers, a slot 154 is provided in the tabs 156 on at least one end of the cutting board 158, as shown in FIG. 18. The slot 154 is elongated in the direction of belt travel 160. A screw 162 with a smooth, unthreaded shank in the slot 154 extends into the retainer module 164.

Figure 19:
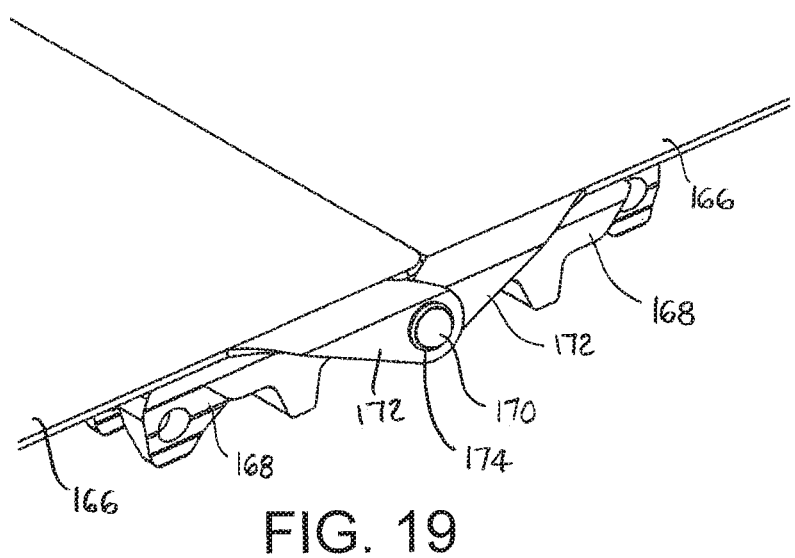
FIG. 19 is an isometric view of a side of a conveyor belt with flexible cutting boards affixed to the belt by the belt's hinge pins.

In FIG. 19, cutting boards 166 are fastened at their corners to belt modules 168 by the belt's hinge rods 170. Tabs 172 extending downward around the sides of the modules 168 from the corners of the boards 166 have holes (not shown) that are aligned with the belt's lateral hinge-rod passageway through interleaved hinge elements of the two adjacent belt modules 168. The hinge rod 170 extends through the aligned holes in the two overlapping tabs 172, into the lateral passageway, and through the aligned holes of two overlapping tabs on the other side of the belt. Enlarged heads 174 formed on opposite ends of the hinge rod 170 retain the cutting boards 166.

Although the invention has been described by a variety of versions, other versions are possible. For example, some of the fastening features used for the rigid cutting boards can be used for the flexible cutting boards, and vice versa. And other fastening schemes can be used. As one example, eyelets extending downward from an end of a cutting board between hinge elements at a hinge joint could receive the hinge rod and retain the board. Or hooks extending downward from an end of a cutting board between hinge elements at a hinge joint could hook under the hinge rod to retain the board.

What is claimed is:

1. A modular conveyor belt comprising:
a series of rows of belt modules joined end to end at hinge joints between consecutive rows and forming an outer belt surface, wherein the distance in a direction of belt travel between consecutive hinge joints defines the belt pitch;
a retainer on some of the rows;
a plurality of plates, each plate retained by the retainer on a separate one of the rows;
wherein the plates have a length in the direction of belt travel that is greater than the belt pitch.

2. A modular conveyor belt as in claim 1 wherein the retainer includes a pair of clips at opposite sides of the row to removably retain the plate at the outer belt surface.

3. A modular conveyor belt as in claim 2 wherein the clips are C-shaped with the open ends of the C-shaped clips facing each other across the row so that the plate can be installed or removed by sliding in or opposite to the direction of belt travel.

4. A modular conveyor belt as in claim 1 wherein the retainer includes a base that spaces the bottom of the plate above the outer belt surface across a gap.

5. A modular conveyor belt as in claim 1 wherein the retainer is located on the outer belt surface of the row.

6. A modular conveyor belt as in claim 1 wherein the retainer includes a clip at one side of the row and a stud extending outward of the outer belt surface at the other side of the row and wherein the plate has a slot extending across the row toward the clip and receiving the stud to register the plate when retained by the clip.

7. A modular conveyor belt as in claim 6 further comprising a cap received in the slot to cover the slot and the stud.

8. A modular conveyor belt as in claim 1 wherein the retainer includes a threaded insert nut embedded in the outer belt surface and a screw that extends though one of the plates and into the threaded insert nut to fasten the plate to the conveyor belt.

9. A modular conveyor belt as in claim 1 wherein the retainer includes a threaded insert nut embedded in a side of the row and a screw and wherein the plates include a tab extending from a side of the plate and having a hole aligned with the inset nut to admit the screw through the tab and into the insert nut to fasten the plate to the conveyor belt.

10. A modular conveyor belt as in claim 1 wherein the retainer includes a thread-forming screw and wherein the plates include a tab extending from a side of the plate and wherein the thread-forming screw extends through the tab and into a side of the belt to fasten the plate to the conveyor belt.

11. A modular conveyor belt as in claim 1 wherein the retainer is a hinge rod joining consecutive rows at one of the hinge joints.

12. A modular conveyor belt as in claim 1 wherein consecutive plates have complementarily shaped confronting edges that form seams that do not extend straight through perpendicular to the outer surface of the modular conveyor belt.

13. A modular conveyor belt as in claim 1 wherein the plates are flexible and attached at opposite ends in the direction of belt travel to retainers on two spaced apart belt rows.

14. A modular conveyor belt as in claim 13 wherein the plates are rectangular with four corners and have a downwardly extending tab at each of the four corners with a slot elongated in the direction of belt travel.

15. A modular conveyor belt as in claim 13 wherein the plates are rectangular with four corners and have an outwardly extending tab at each of the four corners that can be bent downward for attachment to a side of the modular conveyor belt.

16. A modular conveyor belt as in claim 1 wherein the plates are rigid and attached to a retainer on only one of the rows.

17. A modular conveyor belt as in claim 1 wherein the plates are cutting boards.

18. A conveyor belt module comprising:
a first end and an opposite second end;
a plurality of first hinge elements spaced apart along the first end and a plurality of second hinge elements spaced apart along the second end;

an intermediate section having an outer surface between the first and second ends;

a retainer including at least one clip at the outer surface;

a plate retained above the outer surface by the retainer, wherein the plate extends in opposite directions from the retainer past at least one of the first and second ends of the conveyor belt module.

19. A conveyor belt module as in claim 18 wherein the at least one clip has an inner surface coated with a high-friction material.

* * * * *